United States Patent [19]

Adams

[11] 4,093,302
[45] June 6, 1978

[54] VEHICLE COVER ASSEMBLY

[76] Inventor: Robert Michael Adams, 4018 Redwood Ave., Los Angeles, Calif. 90066

[21] Appl. No.: 665,564

[22] Filed: Mar. 10, 1976

Related U.S. Application Data

[63] Continuation-in-part of Ser. No. 654,623, Feb. 2, 1976, abandoned.

[51] Int. Cl.² ............................................. B60P 3/34
[52] U.S. Cl. ..................... 296/23 R; 52/2; 135/1 R; 296/100
[58] Field of Search ............... 296/23 R, 23 MC, 98, 296/100, 137 B; 52/2; 135/1 R

[56] References Cited

U.S. PATENT DOCUMENTS

| 2,830,606 | 4/1958 | Daugherty | 52/2 |
| 3,231,305 | 1/1966 | Beckman | 296/100 |
| 3,433,470 | 3/1969 | Erke | 52/2 |
| 3,779,847 | 12/1973 | Turner | 52/2 |
| 3,901,548 | 8/1975 | Seaman | 296/100 |

Primary Examiner—Kenneth H. Betts
Assistant Examiner—John A. Carroll
Attorney, Agent, or Firm—Bernard & Brown

[57] ABSTRACT

A camper cover for mounting over the cargo area of a vehicle, for example a truck such as a pick-up truck. The camper cover includes a plurality of frame members adapted for mounting the frame members on a vehicle to form a camper frame over the cargo area of the vehicle. An inflatable cover member is attached to the camper frame to form the camper cover. The inflatable cover member is preferably formed of opposed flexible, air tight sheets, such as polyvinylchloride, seamed together to form an inflatable enclosure between the sheets, with the sheets being further attached together by a plurality of longitudinal seams to form adjacent inflatable sections within the enclosure. The inflatable sections are in gas communication, adapted for introducing a gas, e.g., air, into and withdrawing the gas from the inflatable cover member. When inflated, the cover member conforms to the camper frame. The inflatable cover member is secured to the sidewalls of the cargo area of a vehicle. By way of example, this may include a bead of the flexible material formed along each side edge of the inflatable cover member, and a slotted channel member provided along each sidewall of the vehicle cargo area to receive and retain the beads. Alternatively, this may include hook and loop fastening tapes attached to the sidewall and the inflatable cover member.

23 Claims, 9 Drawing Figures

U.S. Patent  June 6, 1978  Sheet 1 of 2  4,093,302
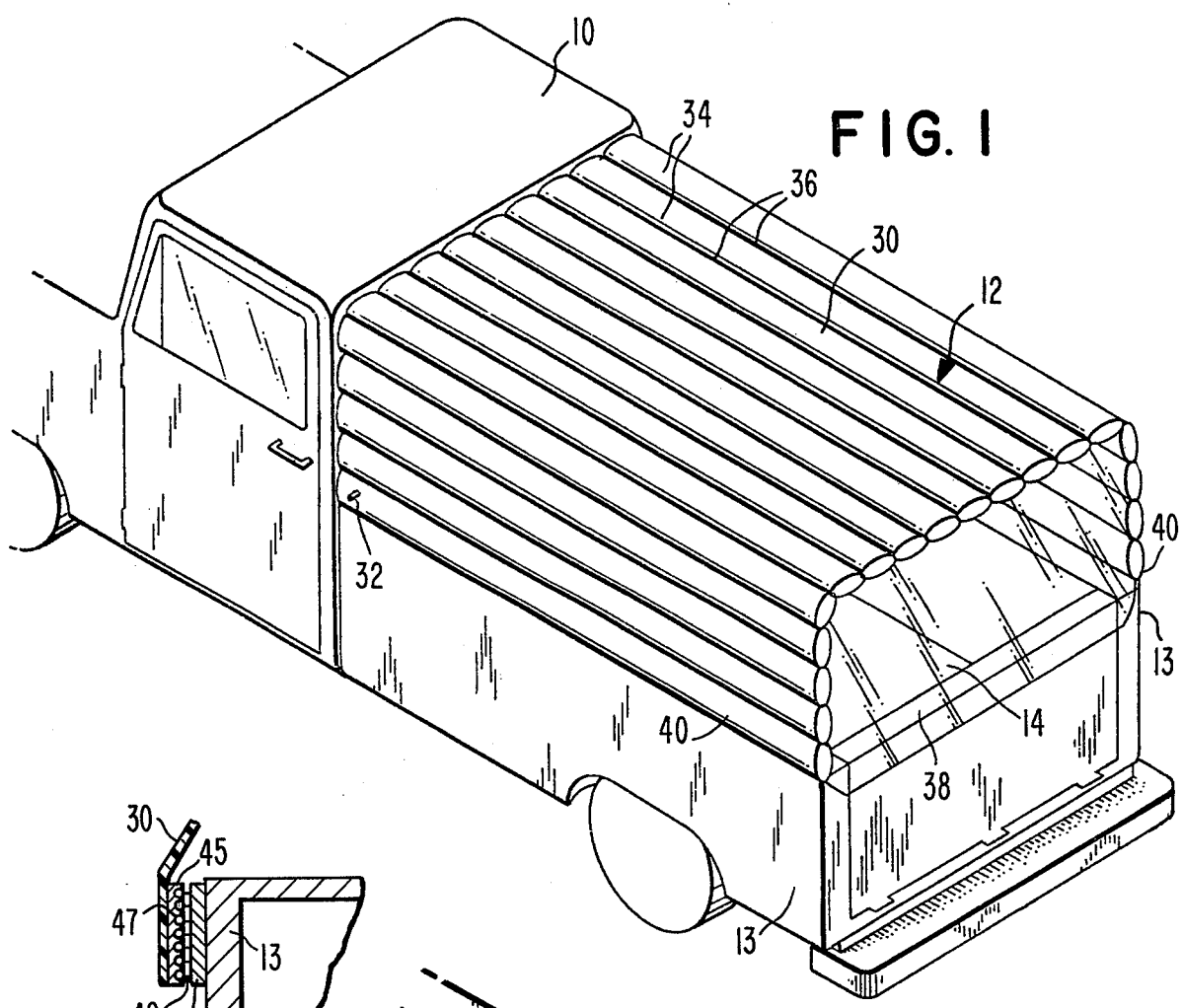
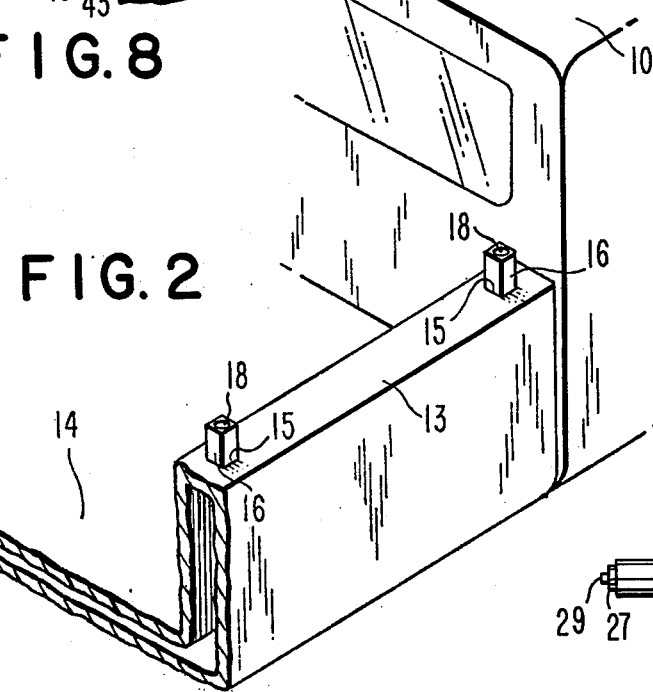

U.S. Patent   June 6, 1978   Sheet 2 of 2   4,093,302
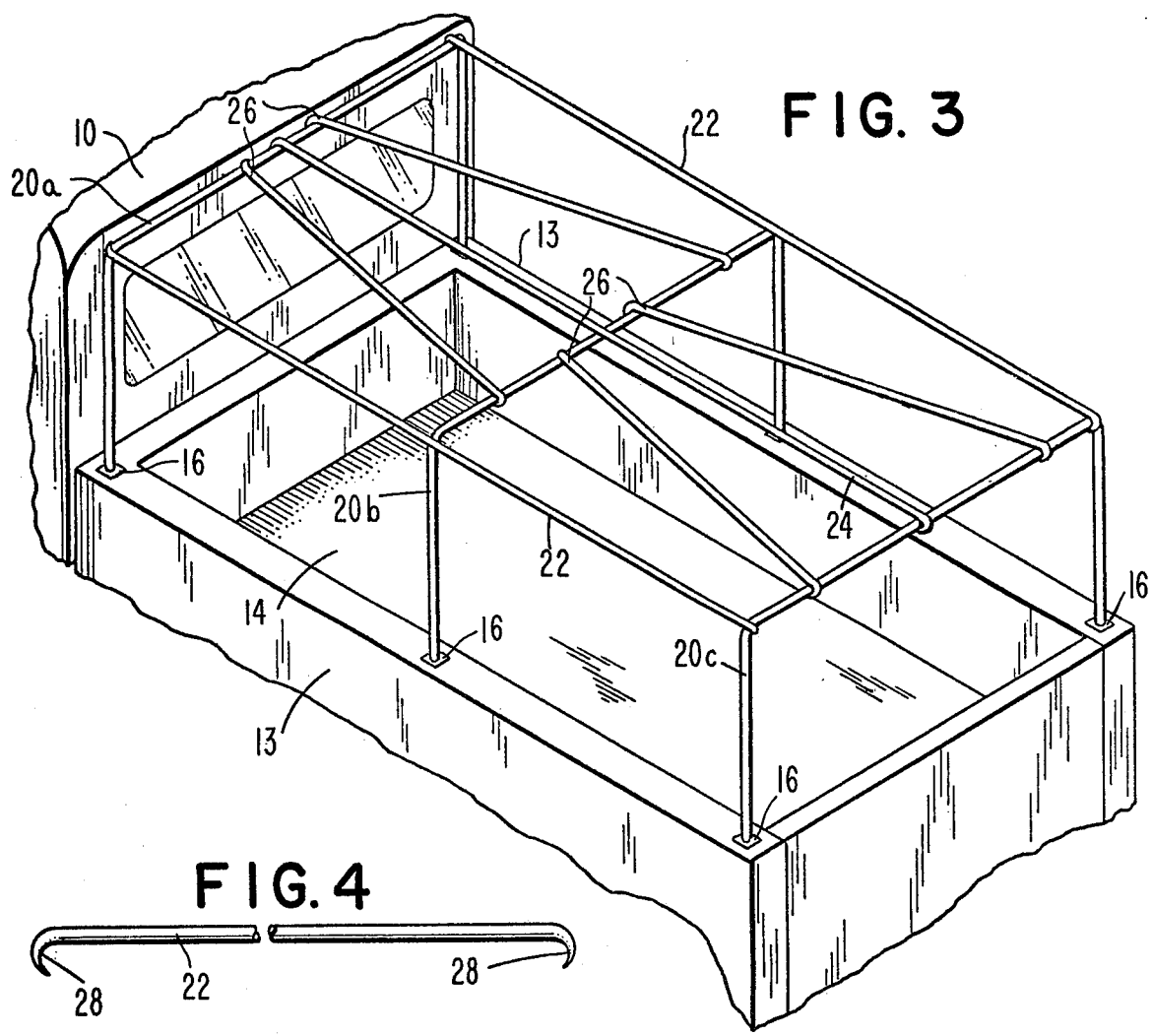
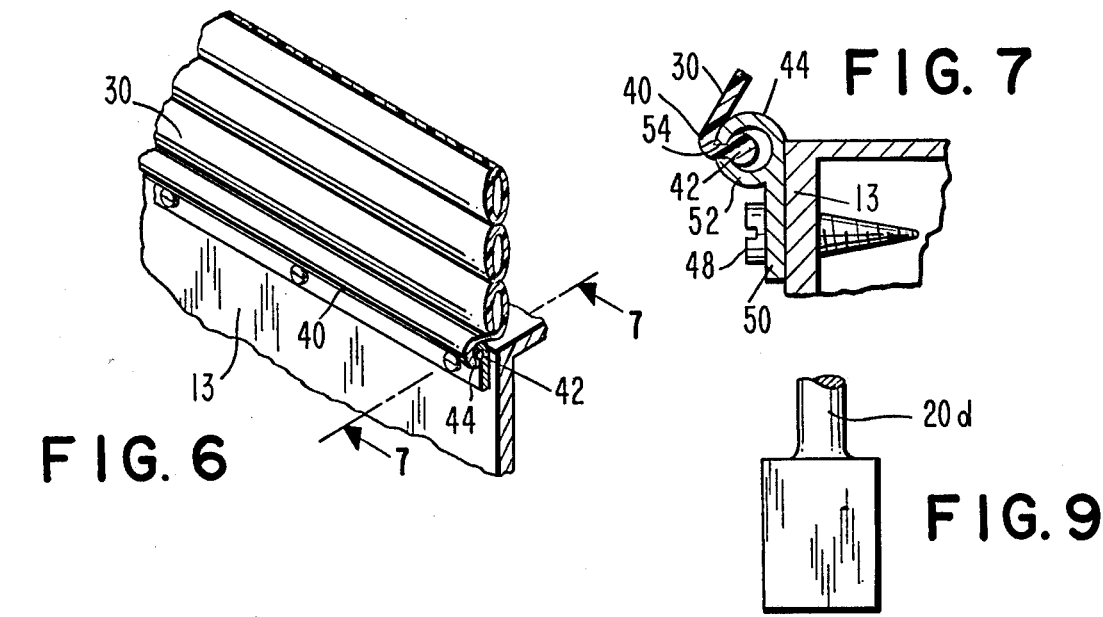

VEHICLE COVER ASSEMBLY

This application is a continuation-in-part of copending application Ser. No. 654,623, filed Feb. 2, 1976, and abandoned.

The present invention pertains to a camping vehicle. More particularly the present invention pertains to a camping cover for mounting on a vehicle such as a truck, for example a pick-up truck, to provide camping facilities.

Camping is an activity of increasing popularity. Numerous persons travel extensively with camping vehicles and used such vehicles for lodging during their travels, particularly during vacation periods. Camping trailers have increased in popularity in recent years; however, use of a camping trailer involves towing the trailer behind a car or truck. This slows down travel between campsites and reduces the gasoline mileage of the pulling vehicle. In addition, once a campsite is reached, the camping trailer generally must be assembled, which can be a time-consuming and laborious process particularly in inclement weather or during darkness. When not in use, the camping trailer must be stored, and because of its bulk, a sizable storage location is required.

Self-powered camping vehicles have come into increasing use recently, also. These vehicles are capable of traveling over the highway and then of providing camping facilities with a minimum of set up. The vehicles are very expensive, however, and are not suited to general use but instead are dedicated to a camping function.

There have been developed camping enclosures for attachment to pick-up trucks. Many of these are large, heavy, metallic and wooden structures mounted permanently or semi-permanently to the bed of a pick-up truck. While such camping enclosures are readily transported on the pick-up truck and do not require extensive assembly once a campsite is reached, they are also an expensive investment. In addition, during off-season or other times when camping is not being done, they either make use of the pick-up truck for hauling purposes impossible, or they require a large storage space.

There have been purposed camping enclosures for ready attachment to vehicles. U.S. Pat. No. 3,489,453, by way of example, shows a camper unit suited for attachment to a pick-up truck or an automobile and having two compartments, one of which is positioned on each side of the carrying vehicle. U.S. Pat. No. 3,515,426 shows a camping enclosure for mounting on the trunk lid of an automobile. U.S. Pat. No. 3,649,063 shows a camping shelter mounted on a frame which straddles the cargo area of a pick-up truck. Each of these camping units, however, must be collapsed when transported on the vehicle. Thus, they each require extensive assembly when a campsite is reached. In addition because they must be collapsed, articles cannot conveniently be carried inside them during travel. Any articles utilized within the camping structure must be stored elsewhere during movement.

The present invention is a camper cover suited for attachment to a vehicle such as a pick-up truck in a manner permitting driving of the pick-up truck with the camper cover fully assembled thereon. In a second aspect, the present invention is a camping vehicle including such a camper cover mounted on a vehicle such as a pick-up truck. The camper cover of the present invention can be removed and collapsed for ready storage in a small storage space when its use is not desired. In accordance with the present invention, a plurality of frame members are mounted over the cargo area of a vehicle to form a camper frame, and an inflatable cover member is attached over the camper frame, providing camping facilities within the camper cover and in the cargo area of the vehicle. The vehicle can readily be driven from location to location with the camper cover fully mounted thereon, and yet when camping is not desired for an extended period, but use of the vehicle, for example for general hauling or other purposes, is desired, the camper cover can readily be removed and collapsed for easy storage in a relatively small space. The vehicle, by way of example, might be a pick-up truck. In a preferred form of the present invention, the frame members are tubular members, including tubular bow member secured to the vehicle, e.g., in the stake holes of the pick-up truck, and tubular brace members which interconnect the tubular bow members. The tubular brace members preferably include a first group of brace members which extend between the bow members to urge the bow members apart and a second group of brace members which extend between the bow members to urge the bow members together, thereby imparting considerable rigidity to the camper frame formed by the frame members. In one preferred embodiment, the inflatable cover member is secured in position on the vehicle by means of a pair of slotted extrusions fastened to the sidewalls of the vehicle cargo area and a mating pair of elongated, flexible beads formed along the side edges of the inflatable cover. In a second preferred embodiment, a pair of cooperating tapes is provided for each side edge of the inflatable cover. One tape of each cooperating pair is secured to the sidewalls of the vehicle cargo area, while the other tape of each pair is secured to said edge of the inflatable cover. One tape of each cooperating pair includes a plurality of hook members, and the second tape of each pair includes a plurality of loop members adapted to be engaged by the hook members to provide a separable fastener. The camper cover is thus secured to the vehicle, permitting movement of the vehicle with the camper cover in its assembled condition. The camper cover of the present invention can be used in connection with various vehicles which may be self-powered or even with other vehicles such as trailers. However, the camper cover is particularly suited for use with pick-up trucks.

These and other aspects and advantages of the present invention are more apparent from the following detailed description and claims, particularly when considered in conjunction with the accompanying drawings in which like parts bear like reference numerals. In the drawings:

FIG. 1 is perspective view of a camper cover mounted on a suitable vehicle, such as a pick-up truck, in accordance with the present invention;

FIGS. 2 and 3 are fragmentary perspective views showing the mounting of components of the camper cover on a pick-up truck in accordance with the present invention;

FIG. 4 depicts one embodiment of frame members suitable for use in the camper cover of the present invention;

FIG. 5 depicts another embodiment of frame members suitable for use in the camper cover of the present invention.

FIG. 6 is a fragmentary perspective view showing a detail of the camper cover in accordance with the present invention;

FIG. 7 is an enlarged fragmentary sectional view taken along line 7—7 of FIG. 6;

FIG. 8 is an enlarged fragmentary sectional view similar to FIG. 6 but illustrating a second embodiment of the camper cover in accordance with the present invention; and FIG. 9 is a fragmentary view illustrating a modified form of one component suitable for use in the camper cover of the present invention.

The form of the camper cover 12 of the present invention illustrated in FIG. 1 is adapted for use on a pick-up truck 10 of conventional design. Camper cover 12 fits over cargo area 14 of pick-up truck 10 to provide an enclosed space suitable for sleeping, storage, etc. With camper cover 12 in place, pick-up truck 10 can still be driven, and so disassembly of the camper cover 12 is not required when moving from one camping location to another or when otherwise driving truck 10.

Pick-up trucks generally are provided with stake holes in the upper horizontal surface of the sidewalls 13 of the cargo area. As depicted in FIG. 2, each such stake hole 15 of pick-up truck 10 has a plug member 16 fitted snuggly therein. Each plug member 16 has an opening 18 in its upper surface. As depicted in FIG. 3, a plurality of generally U-shaped bow frame members 20 are supported by plug members 16, with the free ends of each bow member 20 inserted within an opening 18 of a plug member 16, each plug member 16, in turn, being within a stake hole 15 of pick-up truck 10. Typically there might be six stake holes 15 arranged in three pairs on the two sidewalls 13 of cargo area 14, and in such case three bow members 20a, 20b, and 20c are utilized, as illustrated in FIG. 3. A longitudinal frame member 22 extends along each side of cargo area 14 from the frontmost bow member 20a, immediately behind the cab of truck 10, to the rearmost bow member 20c, adjacent the rear end of cargo area 14, with the longitudinal frame members 22 positioned adjacent the upper portion of bow members 20. Preferably, another longitudinal frame member 24 extends from bow member 20a to bow member 20c about midway between the two sides of cargo area 14. If desired, to reduce the storage space required when camper cover 12 is not installed on a vehicle, each bow member 20a, 20b, and 20c and each longitudinal frame member 22 and 24 can be formed in two or more sections with ends shaped, for example by swaging, to permit the sections to be fitted together to form the bow member or frame. Two additional frame members 26 extend between the frontmost bow member 20a and the center bow member 20b in a truncated V to provide additional bracing. Likewise, two additional frame members 26 extend from the center bow member 20b to rhe rearmost bow member 20c in a V brace.

Each of the frame members 20, 22, 24, and 26 is preferably a cylindrical structure and, by way of example, might be formed of a hollow metal tube, for example of aluminum, of a diameter in the order of from about ½ to about ¾ inch. By way example, if the frame members 20 are formed of ¾ inch tube, then openings 18 in plug members 16 might be in the order of about 13/16 inch to receive the ends of frame members 20. The frame members 22, 24, and 26 might be formed of such hollow tube with the ends 28 flattened and rolled as illustrated in FIG. 4 so that each end 28 can snap over a frame member 20. Preferably longitudinal frame members 22 and 24 have such rolled ends 28, while the additional frame members 26 are of the type depicted in FIG. 5, which shows frame member 26a in the form of a hollow metal tube 25 having a slightly tapered plug 27 of wood or other suitable material securely inserted into each end, with a pin 29 extending outwardly from each plug 27. Bow members 20a, 20b, and 20c are then provided with openings to receive pins 29. Frame members 26a are of a length such that they urge adjacent ones of the bow members 20 apart, while longitudinal frame members 22 and 24 urge the bow members 20 together. As a consequence, the camper frame has considerable rigidity, yet can be assembled with no screws, nuts, bolts, etc., and with no requirement for tools.

Alternatively, the frame members 20, 22, 24, and 26 could be formed of other material such as wood, and if desired, frame members 22, 24, and 26 can be held in the desired positions on frame member 20 by bolts and nuts or other suitable means.

Once the frame members 20, 22, 24, and 26 are mounted on the pick-up truck by means of plug members 16 to form the camper frame, inflatable cover member 30 is positioned over the camper frame, as illustrated in FIG. 1. Inflatable cover member 30 is formed of opposed flexible, air tight sheets seamed together, for example by heat sealing, at their edges and further attached together by a plurality of longitudinal seams 36 to form adjacent inflatable rigs 34 within the enclosure. The several inflatable ribs 34 are in gas communication with each other by means of openings across or at the ends of the seams 36. Gas inlet means such as air valve 32 is provided so that gas, e.g., air, can be introduced into and withdrawn from the interior of inflatable cover member 30. When thus inflated, cover member 30 conforms to the shape of the camper frame and has considerable rigidity and is of a configuration analagous to that of an air mattress. Preferably, the inflatable rigs 34 of inflatable cover member 30 are divided into a number of groups of ribs, with the several ribs within each group in gas communication with each other but with the several groups not in gas communication. A gas inlet means is provided for each group. Then should a rib 34 be punctured, only its group of ribs would be deflated while the remainder of inflatable cover member 30 is still inflated. By way of illustration, ribs 34 could be divided into four groups covering the left side, the left top, the right top and the right side of cargo area 14.

Inflatable cover member 30 might be formed of a synthetic, such as polyvinylchloride, for example having a thickness in the order of 0.020 inches. The inflated ribs 34 might have a thickness in the order of two inches. Seams 36 between ribs 34 might be spaced about 4½ inches apart when cover member 30 is deflated. Inflatable cover member 30 is of a size determined by the size of cargo area 14 and typically might measure about 12 by 8 feet. Preferably a clear rear window panel 38 and an clear front window panel (not shown), which might be inflated, extend from the rear edge and the front edge respectively of inflatable cover member 30, adapted to close the rear and front ends of camper cover 12. Rear window panel 38 can be held in place by snaps or other releasable fasteners for easy access to the interior of camper cover 12. Air valve 32 can be of the type commonly found on automobile or truck tires.

FIGS. 6 and 7 depict a first means for securing inflatable cover member 30 over the camper frame. As there depicted, each side edge 40 of inflatable cover member 30 is provided with an extruded bead 42 formed of the same flexible material as the inflatable cover. A channel member 44 is fastened to each side edge of cargo area 14 of pick-up truck 10 by means such as screws 48. Channel member 44 includes a flange portion 50, through which screws 48 pass to fasten channel member 44 to sidewall 13, and a channel portion 52 which is an elongated tubular extrusion having a slit 54 therethrough on its outer surface opposite the junction of channel portion 52 and flange portion 50. Bead 42 of inflatable cover member 30 fits within channel portion 52, and inflatable cover member 30 extends through slit 54. A channel member 44 extends the length of cargo area 14 on the sidewall 13 on each side of cargo area 14. Thus, the two sides 40 of inflatable cover member 30 are firmly held onto cargo area 14, fitting snuggly about the camper frame formed by frame members 22, 24, and 26 to hold camper cover 12 securely in place.

FIG. 8 depicts a second embodiment of means for securing inflatable cover member 30 over the camper frame. A pair of cooperating tapes is provided for each side edge 40 of inflatable cover member 30. As depicted in FIG. 8, one tape 43 of each cooperating pair is secured to the sidewall 13 of truck 10, while the other tape 45 of each pair is secured to the side edge 40 of inflatable cover member 30. One tape of each cooperating pair, for example tape 43, has a plurality of hook members 46 extending therefrom, while the second tape of each pair, for example tape 45, has a plurality of loop members 47 on its exposed surface. Hooks 46 engage loops 47 to fasten inflatable cover member 30 over the camper frame formed by frame members 20, 22, 24 and 26 on cargo area 14 of pick-up truck 10.

Cooperating hook and loop fasteners which provide a separable closure member are disclosed in U.S. Pat. Nos. 2,717,437 and 3,009,235 and are marketed as Velcro fasteners. Tape with such hooks extending therefrom and with a pressure sensitive adhesive backing, suitable for use as tape 43 with hook members 46, is available commercially from 3M Company as Scotchmate SJ-3528X Hook-B Sensitive Tape. Likewise, tape with loops extending therefrom and with a pressure sensitive adhesive backing, suitable for use as tape 45 and loops 47, is availble commercially from 3M Company as Scotchmate SJ-3527X Loop Pressure Sensitive Tape. These tapes can readily be applied to sidewall 13 and to inflatable cover member 30.

Camper cover 12 is rapidly assembled on a vehicle such as a pick-up truck 10. First plug members 16 are inserted into the stake holes 15 on the pick-up truck; then U-shaped frame members 20 are inserted into the openings 18 of the plug members 16. Next frame members 22, 24, and 26 are fastened to frame members 20, as depicted in FIG. 3, to form the camper frame. Inflatable cover member 30 is then installed over the camper frame, either by inserting beads 42 into channel members 44 or by placing tape 45 in proper position adjacent tape 43 and applying pressure. Finally, cover member 30 is inflated through air inlet valve 32, thereby completing assembly of the camper cover 12. The camper frame and fastening of side edges 40 of inflatable cover member 30 sidewalls 13 securely hold camper cover 12 to pick-up truck 10, permitting driving of the pick-up truck with the camper cover installed. Consequently, pick-up truck 10 can be driven from place to place with camper cover 12 in position. Should it be desired to utilize the vehicle without camper cover 12, the camper cover can readily be deflated, removed and stored in a very small space.

If desired rather than using plug members 16, the ends of frame members 20 can be inserted directly into the stake holes of the pick-up truck, thus constituting the mounting means. Either the frame members can be of the cross-section required by the stake holes, or each frame member can have its end portion shaped to fit the stake holes, as illustrated on frame member 20d of FIG. 9.

Although the present invention has been described with reference to a preferred embodiment, numerous rearrangements and modifications could be made, and still the result would be within the scope of the invention.

What is claimed is:

1. A camper cover adapted for attachment to a vehicle having a cargo area, said camper cover comprising:
   a plurality of longitudinally spaced-apart, transverse frame members having an upper portion and depending side portions and adapted for mounting on a vehicle to form a camper frame over the cargo area of a vehicle;
   an inflatable cover member having a front edge, a rear edge and two side edges and formed of opposed flexible, air tight sheets seamed together to form an inflatable enclosure between said sheets, said opposed sheets being further attached together by a plurality of elongated seams to form adjacent, longitudinal, inflatable sections within said enclosure, said inflatable sections being in gas communication and having means for introducing a gas into said inflatable cover member, said inflatable cover member adapted to fit over the camper frame formed by said frame members to form a camper cover; a plurality of longitudinal bracing members extending between adjacent frame members to form a V brace; and
   means for securing said two side edges of said inflatable cover member to the sidewalls of the cargo area of the vehicle.

2. A camper cover as claimed in claim 1 in which said frame members are cylindrical frame members.

3. A camper cover as claimed in claim 2 in which said frame members are tubular frame members.

4. A camper cover as claimed in claim 1 in which a first group of said bracing members are adapted to extend between said frame members to urge said frame members apart, and a second group of said bracing members are adapted to extend between the end said frame members to urge said end frame members together, thereby imparting rigidity to the camper frame formed by said frame members.

5. A camper cover as claimed in claim 1 further comprising mounting means for mounting said frame members on the vehicle.

6. A camper cover as claimed in claim 5 in which:
   said mounting means are a plurality of plugs adapted for insertion into stake holes in the sidewalls of the cargo area of the vehicle, with each of said plurality of plugs having an opening therein; and
   the depending side portions of said frame members being adapted for insertion in the openings of said plugs.

7. A camper cover as claimed in claim 1 in which said inflatable cover member includes a front panel extending from said inflatable cover member front edge to close the front end of said camper cover when over the cargo area of the vehicle.

8. A camper cover as claimed in claim 7 in which said front panel is an inflatable panel.

9. A camper cover as claimed in claim 7 in which said inflatable cover member includes a rear panel extending from said inflatable cover member rear edge to close the rear end of said camper cover when over the cargo area of the vehicle.

10. A camper cover as claimed in claim 1 in which said inflatable cover member includes a rear panel extending from said inflatable cover member rear edge to close the rear end of said camper cover when over the cargo area of the vehicle.

11. A camper cover as claimed in claim 1 in which said inflatable cover member is formed of polyvinylchloride.

12. A camper cover as claimed in claim 1 further comprising a vehicle having a cargo area with sidewalls, said frame members being mounted on said vehicle to form a camper frame over said cargo area; said inflatable cover member being fitted over said camper frame; said securing means securing said two side edges of said inflatable cover member to said sidewalls.

13. A camper cover as claimed in claim 12 in which said vehicle is a pick-up truck.

14. A cover assembly adapted for attachment to a vehicle having a cargo area, said cover assembly comprising:
a plurality of longitudinally-spaced, transverse frame members adapted for mounting on a vehicle to form a frame over the cargo area of the vehicle, said frame members having an upper portion and depending side portions,
an inflatable cover member having an upper portion and depending side portions, said cover member having opposed, flexible, air-tight members forming a plurality of transversely curved, longitudinally extending sections in each of said upper and depending side portions of said cover member;
a plurality of longitudinal bracing members extending between said frame members;
means for securing said cover member over said frame members; and in which said bracing members comprise a pair of members having forward and rear portions attached to separate ones of said frame members, and said forward portions are closer together than said rear portions.

15. A cover assembly of claim 14 in which said bracing members comprise a pair of members having forward and rear portions attached to separate ones of said frame members, and said forward portions are closer together than said rear portions.

16. A cover assembly adapted for attachment to a vehicle having a cargo area, said cover assembly comprising:
a plurality of transverse frame members adapted for mounting on a vehicle to form a frame over the cargo area of the vehicle, said frame members comprising first and second end and intermediate frame members, said frame members having an upper portion and depending side portions,
first longitudinal bracing means extending between said end frame members, second bracing means comprising a first pair of support members extending between said first end frame member and an intermediate frame member, the ends of said first pair of support members being closer at said first end frame member than at their intermediate frame members;
third longitudinal bracing means comprising a second pair of support members extending between said second end frame member and an intermediate frame member, the ends of said second pair of support members being closer together at their intermediate frame member than at said second end frame member;
an inflatable cover member having an upper portion and depending side portions, said cover member having opposed, flexible, air-tight members forming a plurality of transversely curved, longitudinally extending, adjacent sections in each of the upper and depending side portions of said cover member; and
means for securing said cover member over said frame members.

17. The cover assembly of claim 16 in which said second bracing means urges said first end frame member and its intermediate frame member apart, and in which said third bracing means urges said second end frame member and its intermediate frame member apart.

18. The cover assembly of claim 17 in which said second and third bracing means extend from their respective end frame members to the same intermediate frame member.

19. The cover assembly of claim 18 in which said first bracing means urges said end frame members together.

20. The cover assembly of claim 19 in which said bracing means are attached to said frame members by snap-type connections.

21. A camper cover adapted for attachment to a vehicle having a cargo area, said camper cover comprising:
a plurality of longitudinally spaced-apart, transverse frame members having an upper portion and depending side portions and adapted for mounting on a vehicle to form a camper frame over the cargo area of a vehicle;
an inflatable cover member having a front edge, a rear edge and two side edges and formed of opposed flexible, air tight sheets seamed together to form an inflatable enclosure between said sheets, said opposed sheets being further attached together by a plurality of elongated seams to form adjacent, longitudinal, inflatable sections within said enclosure, said inflatable sections being in gas communication and having means for introducing a gas into said inflatable cover member, said inflatable cover member adapted to fit over the camper frame formed by said frame members to form a camper cover; a plurality of longitudinal bracing members extending between said frame members;
means for securing said two side edges of said inflatable cover member to the sidewalls of the cargo area of the vehicle; and in which said inflatable sections are divided into a plurality of groups with the inflatable sections within each group being in gas communication with each other but not in gas communication with the inflatable sections of other groups, said inflatable cover member having means for introducing gas into each group of inflatable sections.

22. A camper cover adapted for attachment to a vehicle having a cargo area, said camper cover comprising:
a plurality of longitudinally spaced-apart, transverse frame members having an upper portion and depending side portions and adapted for mounting on a vehicle to form a camper frame over the cargo area of a vehicle;

an inflatable cover member having a front edge, a rear edge and two side edges and formmed of opposed flexible, air tight sheets seamed together to form an inflatable enclosure between said sheets, said opposed sheets being further attached together by a plurality of elongated seams to form adjacent, longitudinal, inflatable sections within said enclosure, said inflatable sections being in gas communication and having means for introducing a gas into said inflatable cover member, said inflatable cover member adapted to fit over the camper frame formed by said frame members to form a camper cover; a plurality of longitudinal bracing members extending between said frame members and means for securing said two edges of said inflatable cover member to the sidewalls of the cargo area of the cargo area of the vehicle in which said securing means comprises:

at least one channel member adapted for attachment to a sidewall of the cargo area of a vehicle and having a slot extending substantially the length thereof; and at least one bead formed on a side edge of said inflatable cover member, said bead being adapted for insertion into one of said channel members with the adjacent portion of said inflatable cover member extending through the channel member slot.

23. A camper cover adapted for attachment to a vehicle having a cargo area, said camper cover comprising;

a plurality of longitudinally spaced-apart, transverse frame members having an upper portion and depending side portions and adapted for mounting on a vehicle to form a camper frame over the cargo area of a vehicle;

an inflatable cover member having a front edge, a rear edge and two side edges and formed of opposed flexible, air tight sheets seamed together to form an inflatable enclosure between said sheets, said opposed sheets being further attached together by a plurality of elongated seams to form adjacent, longitudinal, inflatable sections within said enclosure, said inflatable sections being in gas communication and having means for introducing a gas into said inflatable cover member, said inflatable cover member adapted to fit over the camper frame formed by said frame members to form a camper cover; a plurality of longitudinal bracing members extending between said frame members;

means for securing said two side edges of said two side edges of said inflatable cover member to the sidewalls of the cargo area of the vehicle; and in which said securing means comprises at least one pair of cooperating tapes, one tape of said pair being adapted for attachment to a sidewall of the cargo area of the vehicle, the other tape of said pair being attached to a side edge of said inflatable cover member; one tape of said pair including a plurality of hook members, the second tape of said pair including a plurality of cooperating loop members adapted to be engaged by said hook members to provide a separable fastener.

* * * * *